United States Patent [19]
Kinter

[11] Patent Number: 5,833,144
[45] Date of Patent: Nov. 10, 1998

[54] HIGH SPEED SOLENOID VALVE CARTRIDGE FOR SPRAYING AN AGRICULTURAL LIQUID IN A FIELD

[75] Inventor: Malcolm L. Kinter, Sunnyvale, Calif.

[73] Assignee: Patchen, Inc., Los Gatos, Calif.

[21] Appl. No.: 664,600

[22] Filed: Jun. 17, 1996

[51] Int. Cl.[6] .................................................. B05B 1/14
[52] U.S. Cl. ................. 239/462; 239/575; 239/590.3; 239/600
[58] Field of Search ................ 239/159, 172–590, 239/590.3, 590.5, 575, 553, 553.3, 553.5, 462, 600; 210/222, 695

[56] References Cited

U.S. PATENT DOCUMENTS

| | | | |
|---|---|---|---|
| 3,737,032 | 6/1973 | Burkitt | 209/10 |
| 3,910,701 | 10/1975 | Henderson et al. | 356/39 |
| 3,974,964 | 8/1976 | Pearce et al. | 239/553.3 |
| 4,406,411 | 9/1983 | Gall et al. | 428/577 |
| 4,416,586 | 11/1983 | Diederich et al. | 417/13 |
| 4,570,858 | 2/1986 | Bintner et al. | 239/390 |
| 4,623,510 | 11/1986 | Troy | 376/272 |
| 4,738,799 | 4/1988 | Troy | 252/633 |
| 4,807,663 | 2/1989 | Jones | 239/553.3 |
| 4,811,905 | 3/1989 | Ishikawa et al. | 239/590.3 |
| 4,936,543 | 6/1990 | Kamibayasi | 251/129.15 |
| 4,946,589 | 8/1990 | Hayes | 210/222 |
| 4,961,561 | 10/1990 | Kamibayashi | 251/120 |
| 5,021,160 | 6/1991 | Wolpert | 210/500 |
| 5,021,645 | 6/1991 | Satula et al. | 250/223 R |
| 5,113,892 | 5/1992 | Hull et al. | 137/62 |
| 5,133,382 | 7/1992 | Nielsen | 137/549 |
| 5,137,629 | 8/1992 | Dauchez | 210/222 |
| 5,234,165 | 8/1993 | Rhyne, Jr. | 239/575 |
| 5,238,192 | 8/1993 | McNair | 239/575 |
| 5,296,702 | 3/1994 | Beck et al. | 250/226 |
| 5,335,863 | 8/1994 | DeGrace | 239/575 |
| 5,340,032 | 8/1994 | Stegmaier et al. | 239/575 |
| 5,389,781 | 2/1995 | Beck et al. | 250/226 |
| 5,591,339 | 1/1997 | Robinson | 210/499 |
| 5,647,994 | 7/1997 | Tuunanen et al. | 210/695 |

FOREIGN PATENT DOCUMENTS

| | | |
|---|---|---|
| 968631 | 4/1981 | U.S.S.R. . |
| 1377606 A1 | 2/1988 | U.S.S.R. . |
| WO 84/00211 | 1/1984 | WIPO . |

OTHER PUBLICATIONS

"Controls for Liquid, Gas, Air and Vacuum" KIP Catalog, Oct. 1993, p. 17.

*Primary Examiner*—Andres Kashnikow
*Assistant Examiner*—Lisa Ann Douglas
*Attorney, Agent, or Firm*—Skjerven, Morrill,MacPherson Franklin and Friel; T. Lester Wallace

[57] ABSTRACT

An agricultural spray implement includes a plurality of removable valve/filter/nozzle cartridges. Each removable cartridge has a single housing that retains a magnetized filter, a high speed solenoid valve, and a spray nozzle. In the event the system filter of the spray implement is removed, fine particles which otherwise might clog the solenoid valves are stopped from entering the solenoid valves by the magnetized filters of the valve/filter/nozzle cartridges. Each cartridge has a clean-out purge valve so that its magnetized filter can be unclogged without removal of the magnetized filter from the cartridge housing. A light emitting diode of the cartridge provides a visual indication that the cartridge is dispensing agricultural liquid. The light emitting diode is turned on when the solenoid valve is controlled to be open. In some embodiments, the light emitting diode is not supplied with current until after the solenoid valve has opened and only a smaller holding current is needed to hold the solenoid valve open.

12 Claims, 5 Drawing Sheets

HIGH SPEED SOLENOID VALVE CARTRIDGE FOR SPRAYING AN AGRICULTURAL LIQUID IN A FIELD

FIELD OF THE INVENTION

This invention relates to agriculture. More particularly, this invention relates to a high speed solenoid valve cartridge for spraying an agricultural liquid in a field.

BACKGROUND INFORMATION

U.S. Pat. No. 5,296,702 discloses techniques whereby an apparatus transmits radiation toward an object, receives the reflected radiation, and thereby obtains a spectral reflectance characteristic of the object. Because the spectral reflectance characteristic of a living plant differs from that of soil, weeds growing in a field can be differentiated from soil in the field. When the apparatus detects a spectral reflectance characteristic of a living plant, a high speed solenoid valve is opened allowing herbicide to flow to a spray nozzle and to spray the weed. When the apparatus no longer detects a spectral characteristic of a living plant, the solenoid valve is closed and herbicide is not sprayed onto the bare soil. Use of such an apparatus in spraying weeds in a field results in considerable herbicide savings because herbicide is not wasted on the bare soil.

FIG. 1 (Prior Art) is a simplified block diagram of a sprayer apparatus 1 which puts into practice the above described technique. Herbicide 2 is pumped by a pump 3 from a reservoir 4, through tubing 5, to a plurality of electronically controlled solenoid valves 6 and spray nozzles 7. A system filter 8 (for example, a 50 to 100 mesh filter) in a filter housing 9 is disposed between the reservoir and the pump to prevent particles from passing into the pump and from clogging the solenoid valves and spray nozzles.

When farmers used the sprayer apparatus, however, problems were encountered. Water (for example water obtained from a ditch which may have appeared clear to the farmer) was put into the reservoir and was mixed with herbicide concentrate to make the needed liquid herbicide. When the sprayer apparatus stopped operating properly due to inadequate flow of herbicide to the spray nozzles, it was determined, perhaps due to the water having appeared clear when it was put in the reservoir, that the filter 8 could be removed and the sprayer would continue to operate. The system filter 8 was removed from housing 9 and spraying was resumed without system filter 8. Unfortunately, small particles present in the water then clogged the solenoid valves. Considerable effort was then required to clean the numerous solenoid valves. In some cases, catastophic failures of solenoid valves occurred and the solenoid valves had to be replaced.

SUMMARY

An agricultural spray implement includes a plurality of removable valve/filter/nozzle cartridges. Each removable cartridge has a single housing that retains a magnetized filter, a high speed solenoid valve, and a spray nozzle. In the event the system filter of the spray implement is removed, fine particles which otherwise might clog the solenoid valves are stopped from entering the solenoid valves by the magnetized filters of the valve/filter/nozzle cartridges. Each cartridge has a clean-out purge valve so that its magnetized filter can be unclogged without removal of the magnetized filter from the cartridge housing. A light emitting diode of the cartridge provides a visual indication that the cartridge is dispensing agricultural liquid. The light emitting diode is turned on when the solenoid valve is controlled to be open. In some embodiments, the light emitting diode is not supplied with current until after the solenoid valve has opened and only a smaller holding current is needed to hold the solenoid valve open. This summary does not purport to define the invention. The invention is defined by the claims.

DETAILED DESCRIPTION OF THE PREFERRED EMBODIMENTS

Figure 2:
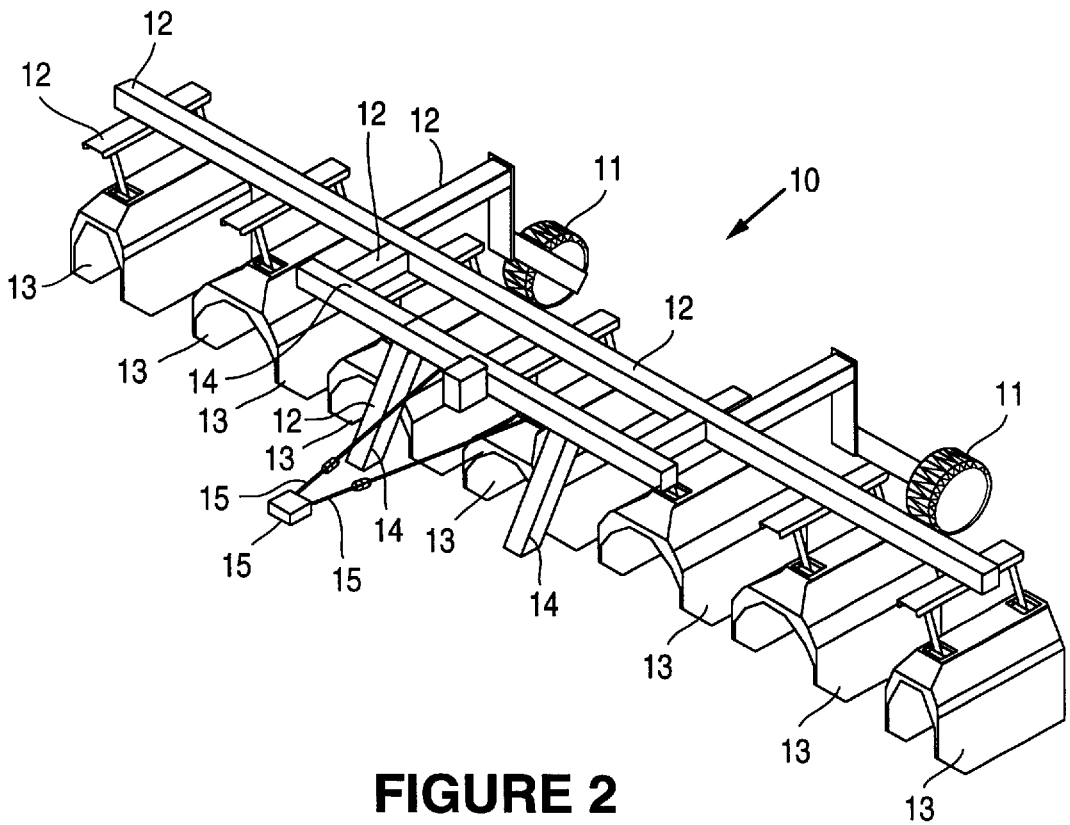
FIG. 2 is a simplified diagram of an agricultural implement in accordance with the present invention.

FIG. 2 is a simplified diagram of an agricultural implement 10 having a pair of wheels 11, a frame structure 12, a plurality of spray hoods 13, and a plurality of detector/spray assemblies 16 (not shown). The implement is attachable to a conventional three-point hitch of a tractor or other vehicle (not shown) using the pi-shaped structure 14 of the frame and the cable structure 15. Implement 10 may be used to spray weeds between the rows of cotton as set forth in U.S. patent application Ser. No. 08/626,857, now U.S. Pat. No. 5,793,035 (the subject matter of which is incorporated herein by reference) entitled "Apparatus and Method for Spraying Herbicide on Weeds in a Cotton Field", filed Apr. 3, 1996. The hoods help prevent the spraying of the cotton plants in the rows with herbicide. The two outermost hoods contain two detector/spray assemblies 16 (not shown) each whereas the inner hoods contain three such assemblies each. Each detector/spray assembly detects plants (i.e. weeds) within a different ten inch swath of the field as the implement passes through the field. The tubing for conducting herbicide to the implement and the electrical connections to the implement are omitted to simplify the illustration.

Figure 3:
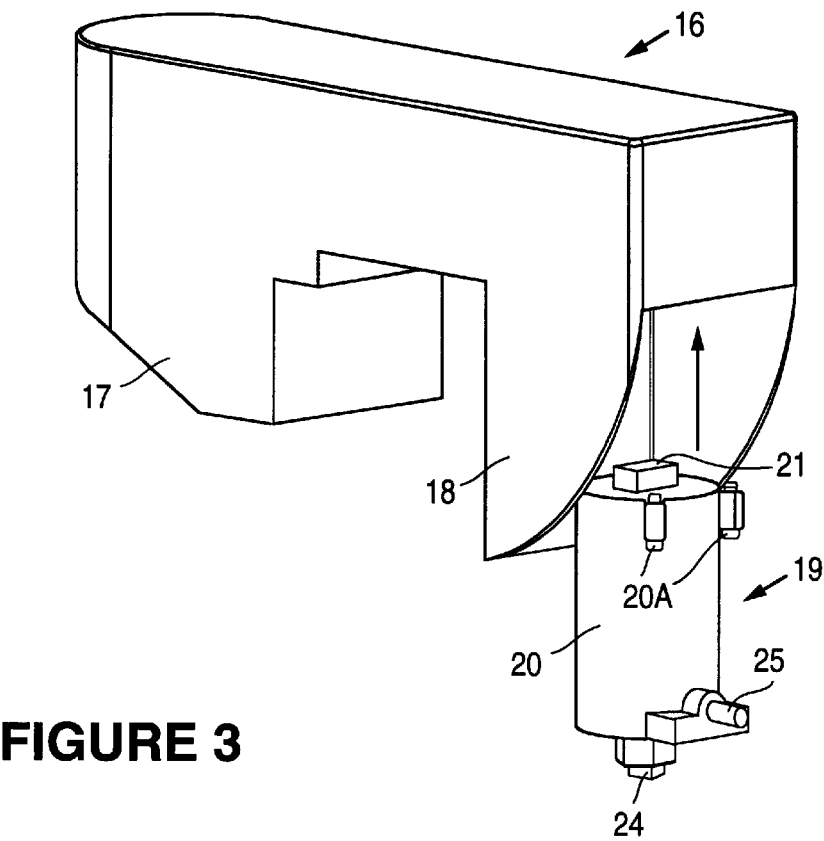
FIG. 3 is a simplified diagram-of a detector/spray assembly of the agricultural implement of FIG. 2.

FIG. 3 is a simplified diagram of a detector/spray assembly 16. See U.S. Pat. No. 5,296,702 (the subject matter of which is incorporated herein by reference) for further details. The optics (the light emitting diodes, lenses, aperture plate, and photodetector) are disposed in portion 17. Light is transmitted downward from portion 17 and reflected light is received into portion 17. A portion 18 of the detector/spray assembly 16 is fashioned to receive a removable valve/filter/ nozzle cartridge 19. The removable valve/filter/nozzle cartridge 19 includes a housing 20, an electrical connector 21, a high speed solenoid valve 31, a magnetized filter 36, a spray nozzle 24, and a tube inlet coupling 25. The electrical connector 21 of the removable cartridge 19 mates with a corresponding electrical connector (not shown) of detector/ spray assembly 16 when the removable cartridge 19 is plugged into the accommodating receiving portion 18. Inlet coupling 25 is coupled to a tube which supplies an agricultural liquid (herbicide, pesticide, growth regulator or nutrient) to the removable cartridge 19. The removable cartridge 19 can be easily removed from the detector/spray assembly 16 by removing two bolts 20A, decoupling the tube from inlet coupling 25, and pulling the removable cartridge 19 from the receiving portion 18.

Figure 4B:
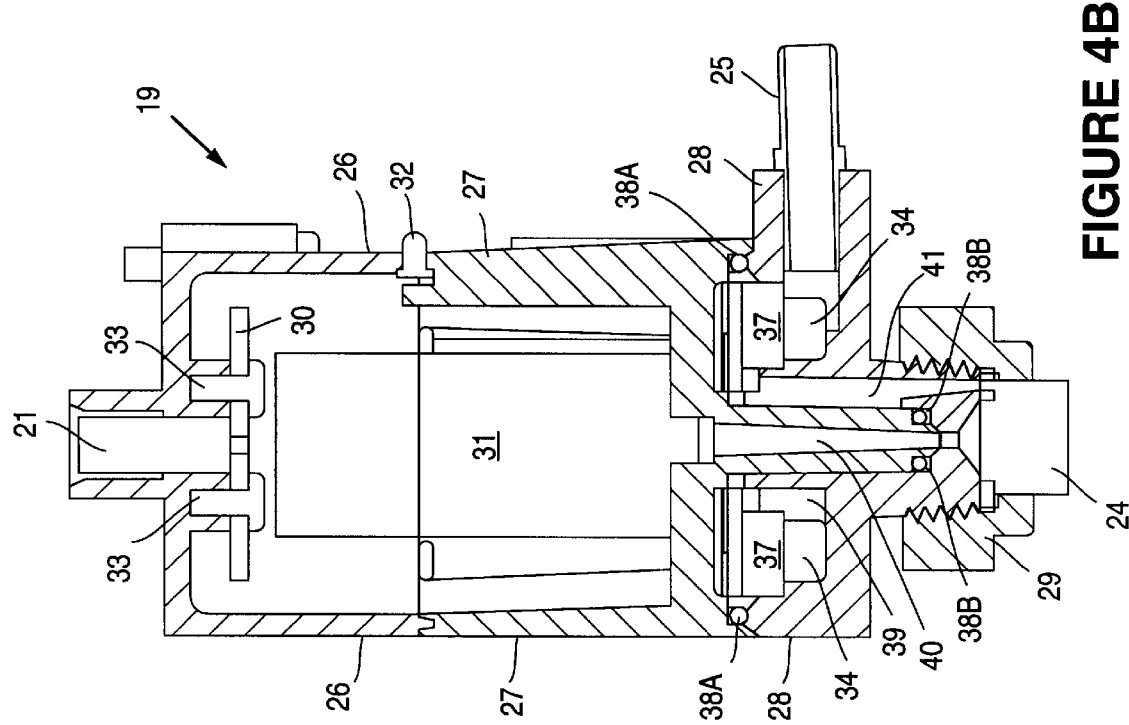
FIGS. 4A, 4B, 4C and 5 are views of a removable valve/filter/nozzle cartridge which fits into the detector/spray assembly of FIG. 3.
Figure 4A:
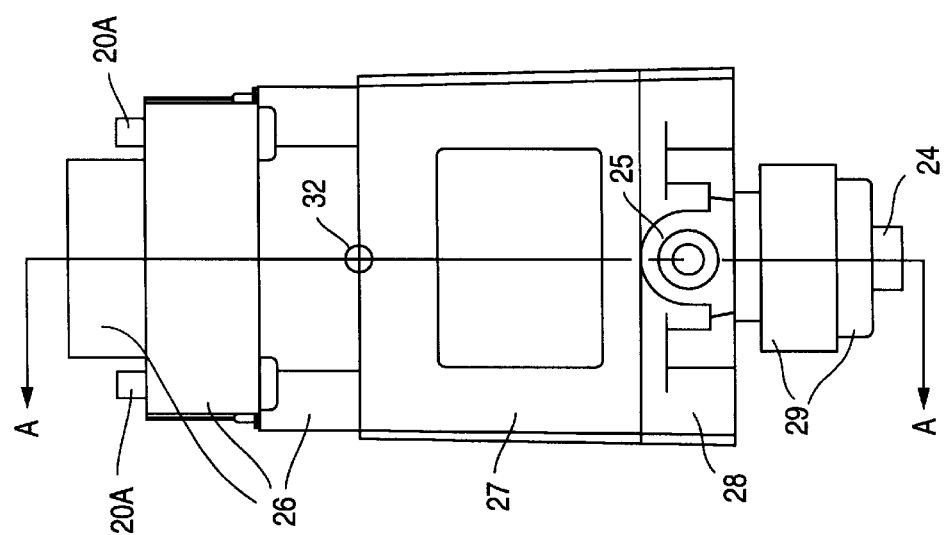
Figure 4C:
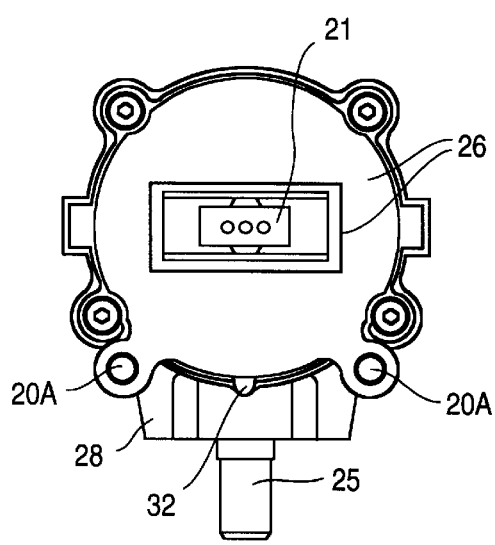
Figure 5:
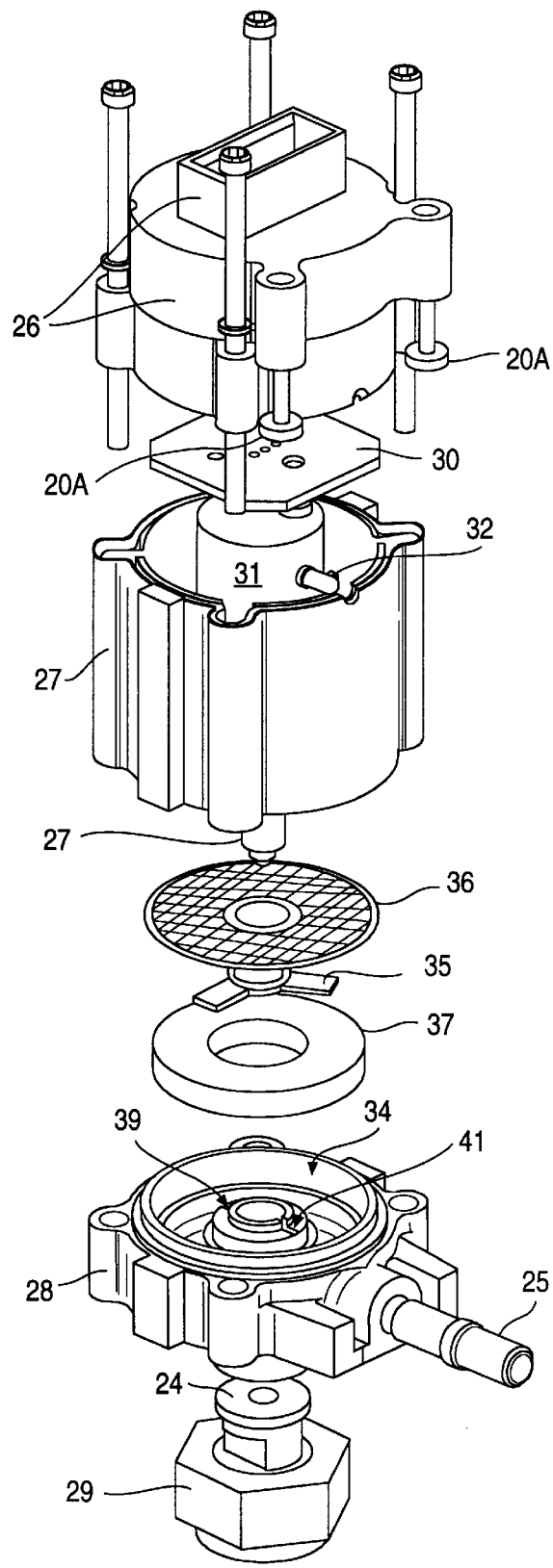

FIG. 4A is a sideview of the removable valve/filter/nozzle cartridge 19 of FIG. 3. FIG. 4B is a simplified cross-sectional view taken along line AA of FIG. 4A. FIG. 4C is a top down view of the removable valve/filter/nozzle cartridge 19 showing the connector 21 in further detail. FIG. 5 is an exploded view of the removable valve/filter/nozzle cartridge 19.

Housing 20 is made of injection molded plastic and includes four portions: 26, 27, 28 and 29. As shown in FIG. 4B, a printed circuit board 30 and high speed solenoid valve 31 are retained in a chamber formed by housing portions 26 and 27. Solenoid valve 31, in one embodiment, is a number 9X7, 0.062 orifice, 5 volt DC, 0.65 watt, 50 MOPD valve manufactured by KIP Incorporated of Farmington, Connecticut. Solenoid valve 31 opens in less than 10 milliseconds and closes in less than 10 milliseconds. Connector 21 and a light emitting diode 32 are fixed to printed circuit board 30. Printed circuit board 30 is fixed to housing portion 26 by two screws 33.

As shown in FIGS. 4B and 5, housing portions 27 and 28 form an annular chamber 34. A magnetized disk-shaped filter 36, a plastic spacer 35, and a permanent donut-shaped magnet 37 are retained by housing portions 27 and 28 such that filter 36 is magnetized by magnet 37. Spacer 35 separates magnet 37 from magnetized filter 36 so that there is more surface area of the filter through which agricultural liquid can flow. O-rings 38A and 38B (see FIG. 4B) are used to form a watertight seal between housing portions 27 and 28. A spray nozzle extension portion of housing portion 28 has threads which engage threads on housing portion 29 such that spray nozzle 24 is retained between housing portions 28 and 29. In one embodiment, spray nozzle 24 is a number 6502 nozzle (65 degrees of spray, outputs 0.2 gallons/minute at 40 psi) available from TeeJet Spraying Systems Company of Wheaton Ill.

The agricultural liquid (for example, herbicide in liquid form) enters inlet coupling 25, passes into annular chamber 34, up through a passage 39 extending in the axial dimension, and into a volume between the top of magnet 37 and the bottom of magnetized filter 36. The agricultural liquid then passes up through the filter 36 and into an annular volume between the top of filter 36 and a surface of housing portion 27. The liquid then passes up through slits (not shown) in the bottom of housing portion 27 and into corresponding passages in solenoid valve 31. When the solenoid valve 31 is open, the fluid passes out of an axial passage of solenoid valve 31, down through an axial passage 40 in a neck portion of housing portion 27, and through an orifice of spray nozzle 24. Of course, the flow of liquid from spray nozzle 24 is stopped when solenoid valve 31 is closed.

Figure 1:
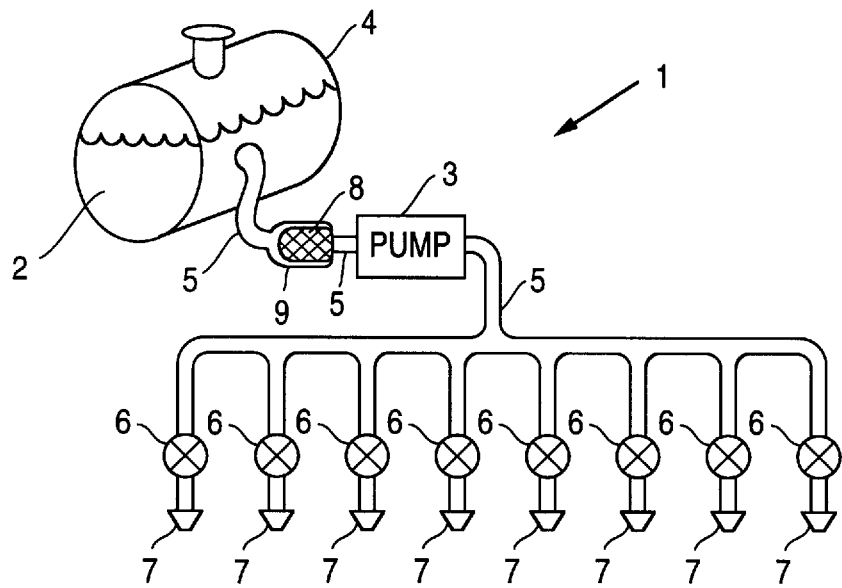
FIG. 1 (Prior Art) is a simplified block diagram of a sprayer apparatus.

Fine magnetic particles of a naturally occurring mineral called "magnetite" are often found in water supplies. Such fine magnetite particles may therefore be unknowingly introduced into the agricultural liquid when a farmer fills the implement reservoir (see FIG. 1) with water. Because the solenoid valves used in the electronic spraying of weeds are high speed and relatively precise mechanisms, they tend to be sensitive to plugging. It is believed that magnetic fields inside these solenoid valves (a solenoid valve is an electro-magnetically actuated device) attract even the finest of magnetic particles and therefore clog the solenoid valves.

The placement of the filter 36 and the solenoid valve 31 together in one housing 20 protects the solenoid valves from clogging even if the farmer were to remove the system filter (see FIG. 1) thinking that the water used to mix the agricultural liquid were free of particles that could clog the system. If, for example, the system filter were removed, then very fine magnetite particles could be filtered out of the agricultural liquid passing into the solenoid valve by magnetized filter 36. In one embodiment, magnetized filter 36 is a photolithically etched metal filter having a 0.005 inch diameter pore size and is manufactured by E-Fab of Santa Clara, Calif. If the implement were operated without the system filter such that one of the removable valve/filter/nozzle cartridges 19 became clogged, then the farmer could not easily remove filter 36 without also removing the solenoid valve 31. Due to the provision of a clean-out purge passage, the farmer would likely use the clean-out purge feature to flush the filter 36 of clogging particles rather than disassembling the housing 20, removing the filter 36, reassembling the housing 20, and attempting to operate the solenoid valve without filter 36.

To flush filter 36 of clogging particles, a clean-out purge passage 41 is used. Housing portion 29 is unscrewed partially from housing portion 28 such that a top surface of spray nozzle 24 no longer blocks a bottom opening of purge passage 41. High pressure agricultural liquid then passes through inlet coupling 25, through annular chamber 34, up through passage 39, across the bottom surface (the clogged surface) of filter 36 in the volume provided by spacer 35, down axially extending purge passage 41 in housing portion 28, around loosened spray nozzle 24, and from the removable cartridge 19. This cleaning of filter 36 can be accomplished without unplugging the removable cartridge 19 from the spray implement 10 and without disassembling the removable cartridge 19.

Magnetized filter 36 may also serve to protect its solenoid valves from other contaminants such as rust and scale from the inside of the tubing between the system filter and the solenoid valves. Filter 36 may also provide protection in the event the system filter is incorrectly installed or a system filter with too large a mesh size is used. Filter 36 may also filter out weld spatter remaining after the manufacturing process.

When implement 10 is being used in a field, the detector/spray assemblies 16 generally do not output visible continuous streams of agricultural liquid. Nor is the operation of the solenoid valves typically audible over tractor noise. It may therefore be difficult for a farmer to determine if a detector/spray assembly 16 is in fact outputting agricultural liquid. Light emitting diode 32 therefore provides a visual indication indicative of the open state of the solenoid valve. In some embodiments, the actual flow of herbicide is monitored so that a more direct indication of the spraying of agricultural liquid is provided. Due to light emitting diode 32, a farmer using implement 10 can obtain a visual indication from a distance that the removable cartridges 19 are outputting agricultural liquid.

Figure 6C:
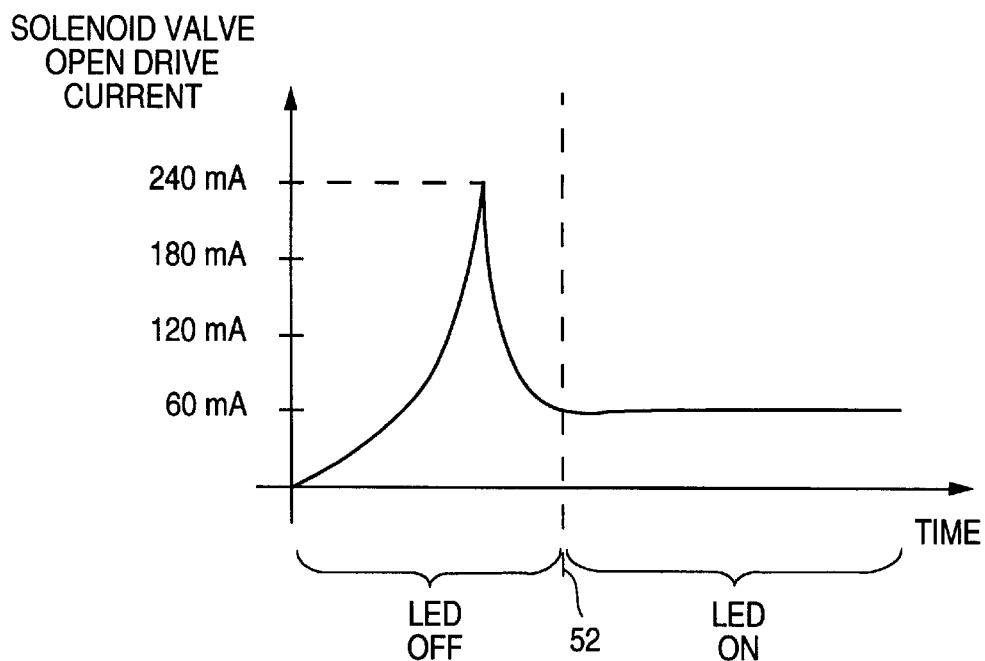
FIG. 6C is a simplified diagram illustrating how the light emitting diode of a valve/filter/nozzle cartridge is driven in accordance with some embodiments.
Figure 6A:
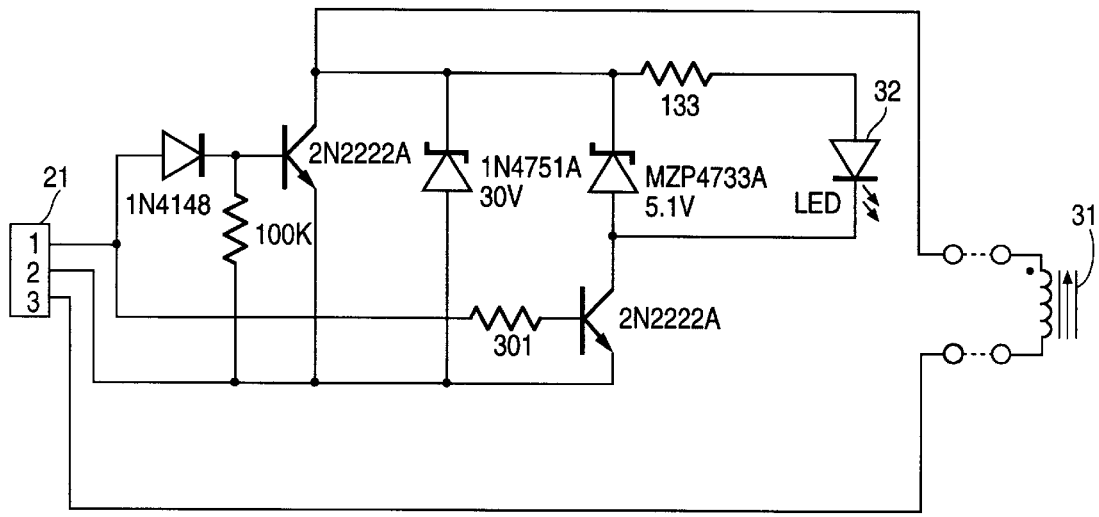
FIGS. 6A and 6B are schematic diagrams illustrating circuitry which drives the solenoid valve of the valve/filter/nozzle cartridge of FIGS. 4A, 4B, 4C and 5.
Figure 6B:
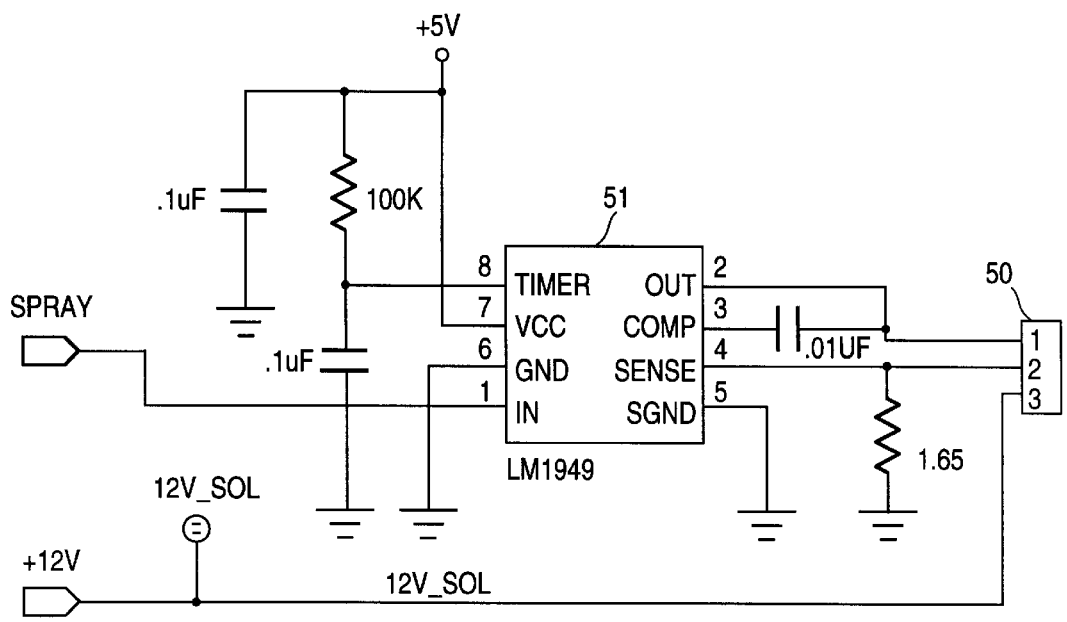

FIGS. 6A and 6B are schematic diagrams illustrating circuitry which drives the solenoid valve 31. FIG. 6A shows the circuitry disposed on printed circuit board 30. Connector 21 of FIG. 6A is coupled to connector 50 of FIG. 6B. Integrated circuit 51 is an LM1949 manufactured by National Semiconductor Corporation of Santa Clara, Calif. Integrated circuit 51 regulates the solenoid valve drive current by sensing the current flowing in the solenoid and providing the necessary control. The signal SPRAY is a digital signal which when high causes solenoid valve 31 to be opened and when low causes solenoid valve 31 to be closed.

FIG. 6C is a simplified diagram illustrating how light emitting diode 32 is driven in accordance with some embodiments when solenoid valve 31 is open. Rather than using a 12 volt solenoid valve, a 5 or 6 volt solenoid valve is used. To open the solenoid valve rapidly, a 12 volt pulse is supplied thereby providing a large amount of current to the solenoid valve winding. To maximize the amount of this current, current is not supplied to light emitting diode 32 during this time period. Once the solenoid valve has opened, only a smaller holding current (for example, 60 milliamperes) is required to keep the solenoid valve open. The voltage supplied to the solenoid valve winding is therefore reduced and current is allowed to flow through the light emitting diode 32. In the example of FIG. 6C, 30 milliamperes flows through the light emitting diode in the time period to the right of dashed line 52 when only the 60 milliamperes of solenoid valve holding current is supplied to the solenoid valve. Driving the light emitting diodes of the implement in this manner prevents the light emitting diodes from limiting the amount of peak current available to open the solenoid valves.

Although the present invention is described in connection with certain specific embodiments for instructional purposes, the present invention is not limited thereto. The terms up and down, top and bottom are relative to one another and are otherwise not limiting. Numerous different filters can be included in the valve/filter/nozzle cartridge and different filter types and forms of filters are possible. Advantages in accordance with the invention can be achieved without the use of magnetized filters. Advantages in accordance with the invention can be achieved without providing a spray nozzle in the cartridge. Accordingly, various configurations, modifications, adaptations, and combinations of various features of the described embodiments can be practiced without departing from the scope of the invention as set forth in the following claims.

What is claimed is:

1. An agricultural spray assembly comprising:
    a magnetized filter;
    a solenoid valve capable of opening in less than 10 milliseconds;
    a spray nozzle;
    a housing retaining said magnetized filter, said solenoid valve and said spray nozzle, an agricultural liquid flowing into an inlet of said housing, through said magnetized filter, through said solenoid valve, and out of said spray nozzle at a flow rate of less than one gallon per minute when said solenoid valve is open;
    wherein said housing forms a chamber into which said fluid passes before passing through said magnetized filter, said housing also forming a purge passage from said chamber such that fluid in said chamber can pass through said purge passage and from said agricultural spray assembly without passing through said magnetized filter.

2. The agricultural spray assembly of claim 1, wherein said housing comprises a spray nozzle extension portion having threads and also comprises a spray nozzle retaining portion having threads which engage the threads of the spray nozzle extension portion, a surface of the spray nozzle being held against a surface of the spray nozzle extension portion by said spray nozzle retaining portion when said threads of said spray nozzle retaining portion are tightly engaging said threads of said spray nozzle extension portion.

3. The agricultural spray assembly of claim 2, wherein said threads of said spray nozzle retaining portion can be loosened with respect to said threads of said spray nozzle extension portion to allow fluid to flow through said purge passage without flowing through said magnetized filter.

4. The agricultural spray assembly of claim 1, further comprising:
    a light emitting diode which generates a visual indication of a state of said solenoid valve.

5. An agricultural spray assembly comprising:
    a magnetized filter;
    a solenoid valve capable of opening in less than 10 milliseconds;
    a spray nozzle;
    a housing retaining said magnetized filter, said solenoid valve and said spray nozzle, an agricultural liquid flowing into an inlet of said housing, through said magnetized filter, through said solenoid valve, and out of said spray nozzle at a flow rate of less than one gallon per minute when said solenoid valve is open, said agricultural liquid being from the group consisting of: an herbicide, a pesticide, a growth regulator and a nutrient; and
    a permanent magnet, said housing retaining said permanent magnet such that said permanent magnet magnetizes said filter, wherein said permanent magnet is donut-shaped and wherein said magnetized filter is disk-shaped.

6. The agricultural spray assembly of claim 5, further comprising:
    a light emitting diode which generates a visual indication of whether said solenoid valve is being controlled to open and/or close.

7. The agricultural spray assembly of claim 5, further comprising:
    means for generating an indication of whether the spray assembly is working properly.

8. An agricultural spray assembly comprising:
    a magnetized filter;
    a solenoid valve capable of opening in less than 10 milliseconds;
    a spray nozzle; and
    a housing retaining said magnetized filter, said solenoid valve and said spray nozzle, an agricultural liquid flowing into an inlet of said housing, through said magnetized filter, through said solenoid valve, and out of said spray nozzle at a flow rate of less than one gallon per minute when said solenoid valve is open, said agricultural liquid being taken from the group consisting of: an herbicide, a pesticide, a growth regulator and a nutrient, wherein said housing forms an annular chamber bounded on one side by said magnetized filter, and wherein said housing also forms an axial passage extending axially through the center of said annular chamber from said solenoid valve to said spray nozzle, said fluid passing into said inlet, through said annular chamber, through said magnetized filter, through said solenoid valve when said valve is open, through said axial passage of said housing, and out of said nozzle.

9. An agricultural spray assembly comprising:
    a magnetized filter;

a solenoid valve capable of opening in less than 10 milliseconds;

a spray nozzle;

a housing retaining said magnetized filter, said solenoid valve and said spray nozzle, an agricultural liquid flowing into an inlet of said housing, through said magnetized filter, through said solenoid valve, and out of said spray nozzle at a flow rate of less than one gallon per minute when said solenoid valve is open; and an electrical connector retained by the housing, the agricultural spray assembly being fashioned to removably plug into a receiving portion of an agricultural implement such that the electrical connector of the agricultural spray assembly mates with a corresponding electrical connector of the agricultural implement.

10. An agricultural spray implement which applies an agricultural liquid to plants in a field when the spray implement is moved with respect to the plants, the implement having a plurality of removable cartridges, each removable cartridge plugging into an accommodating receiving portion of the implement, each removable cartridge comprising:

a magnetized filter;

a solenoid valve in flow communication with the magnetized filter;

a spray nozzle in flow communication with the solenoid valve;

a housing, wherein the solenoid valve, the magnetized filter, and the spray nozzle are retained by the housing; and an electrical connector rigidly coupled with respect to the housing, wherein the electrical connector mates with a corresponding electrical connector on the implement when the removable cartridge is plugged into one of a number of accommodating receiving portions included in the implement, wherein during operation the magnetized filter filters the agricultural liquid and after filtering the agricultural liquid passes through the solenoid valve and through the spray nozzle onto the plants, the solenoid valve of each removable cartridge opening in less than 10 milliseconds and conducting the agricultural liquid at a flow rate of less than one gallon per minute when open.

11. The agricultural spray implement of claim 10 further comprising:

a system filter in flow communication with each cartridge, said agricultural liquid flowing through said system filter prior to flowing through said magnetized filter.

12. An agricultural spray assembly comprising:

a magnetized filter;

a solenoid valve capable of opening in less than 10 milliseconds;

a spray nozzle; and a housing retaining said magnetized filter, said solenoid valve and said spray nozzle, an agricultural liquid flowing into an inlet of said housing, through said magnetized filter, through said solenoid valve, and out of said spray nozzle at a flow rate of less than one gallon per minute when said solenoid valve is open, said housing having a chamber into which said fluid passes before passing through said magnetized filter, said housing also having a purge passage from said chamber such that fluid in said chamber can pass through said pruge passage and from said agricultural spray cartridge without passing through said magnetized filter.

* * * * *